United States Patent [19]
Ryan, Jr. et al.

[11] Patent Number: 5,884,158
[45] Date of Patent: Mar. 16, 1999

[54] CELLULAR TELEPHONE AUTHENTICATION SYSTEM USING A DIGITAL CERTIFICATE

[75] Inventors: Frederick W. Ryan, Jr., Oxford; Nathan Rosenberg, Orange, both of Conn.

[73] Assignee: Pitney Bowes Inc., Stamford, Conn.

[21] Appl. No.: 730,388

[22] Filed: Oct. 15, 1996

[51] Int. Cl.⁶ ................ H04Q 1/39; H04L 9/00
[52] U.S. Cl. ............... 455/410; 455/411; 455/435; 340/825.34
[58] Field of Search .................. 455/411, 410, 455/432, 433, 434, 435; 340/825.31, 825.34

[56] References Cited

U.S. PATENT DOCUMENTS

| | | | |
|---|---|---|---|
| 3,792,446 | 2/1974 | McFiggans et al. | 340/172.5 |
| 4,376,299 | 3/1983 | Rivest et al. | 364/900 |
| 4,447,890 | 5/1984 | Duwel et al. | 364/900 |
| 5,091,942 | 2/1992 | Dent | 380/46 |
| 5,237,612 | 8/1993 | Raith | 380/23 |
| 5,239,294 | 8/1993 | Flander et al. | 455/411 |
| 5,241,598 | 8/1993 | Raith | 455/411 |
| 5,282,250 | 1/1994 | Dent et al. | 380/23 |
| 5,309,501 | 5/1994 | Kozik et al. | 379/58 |
| 5,319,705 | 6/1994 | Halter et al. | 380/4 |
| 5,329,573 | 7/1994 | Chang et al. | 379/58 |
| 5,335,278 | 8/1994 | Matchett et al. | 380/23 |
| 5,341,427 | 8/1994 | Hardy et al. | 380/21 |
| 5,369,401 | 11/1994 | Haines | 340/825.35 |
| 5,377,264 | 12/1994 | Lee et al. | 380/4 |
| 5,377,267 | 12/1994 | Suzuki et al. | 380/23 |
| 5,410,602 | 4/1995 | Finkelstein et al. | 380/21 |
| 5,412,726 | 5/1995 | Nevoux et al. | 380/24 |
| 5,455,863 | 10/1995 | Brown et al. | 380/23 |
| 5,457,737 | 10/1995 | Wen | 379/62 |
| 5,572,193 | 11/1996 | Flanders et al. | 340/825.34 |
| 5,689,563 | 11/1997 | Brown et al. | 340/825.31 |

OTHER PUBLICATIONS

Patent Application Ser. No. 08/575,782.
Article TR45.0.A Interface Spec. for Comm Cryp. Algorithms, Rev. A, Dec. 14, 1994.
Article TR45.0.A Common Cryp. Algorithms, Rev. B, Jun. 21, 1995.

Primary Examiner—Willis R. Wolfe
Assistant Examiner—Hieu T. Vo
Attorney, Agent, or Firm—Ronald Reichman; Melvin J. Scolnick; Robert Meyer

[57] ABSTRACT

This invention relates to a cellular telecommunications systems that utilizes the telephone number the cellular telephone is calling, with the number of telephone calls placed on that cellular telephone, i.e., call count and a seed number to create a digital certificate of the data. The digital certificate is used to make it more difficult to make unauthorized cellular telephone calls. The seed number may be changed after a predetermined number of calls has been made, i.e. one hundred, one thousand, etc. Thus, the transmission of seed numbers between data centers would be substantially reduced.

15 Claims, 4 Drawing Sheets

5,884,158

CELLULAR TELEPHONE AUTHENTICATION SYSTEM USING A DIGITAL CERTIFICATE

FIELD OF THE INVENTION

The invention relates generally to the field of telecommunications systems and more particularly to cellular telecommunications systems that utilize encryption.

BACKGROUND OF THE INVENTION

Cellular mobile radio or cellular telephone systems have been developed for mobile communications. Typically, the planned service area is divided into a number of geographical areas or cells. The available frequency channels for the service area are divided among the cells. A cellular telephone communicates with a nearby cell base station via one of the several radio frequency channels assigned to the cell. Conventional circuits link the base station to the mobile telecommunications switching office, which switches calls between the cellular telephone system and the rest of the telephone network.

Current cellular telephones gain access to the base station, by transmitting to the base station a series of numbers or characters, specific to the cellular telephone being used. The numbers or characters represent the telephone number of the cellular telephone being used and the manufacturer's electronic serial number of the cellular telephone being used. The foregoing characters and numbers are checked at the base station to determine if the cellular telephone being used is allowed to use the base station selected and that the telephone number of the cellular telephone being used has the correct manufactures electronic serial number. If the telephone number and manufacturer's electronic serial number are found to be correct, the base station may further determine if the time elapsed and distance traveled by the cellular telephone from the last cellular telephone call are feasible. If, the cellular telephone traveled a feasible distance in the time elapsed from the last telephone call, the cellular telephone will be connected to the telephone network.

Unfortunately, people using off the shelf electronic receiving equipment are able to intercept and determine the telephone number and manufacturer's electronic serial number of cellular telephones, while the telephone number and manufacturer's electronic serial number are being transmitted at specific radio frequencies to the base station. During, 1993 United States Cellular Telephone companies lost approximately three hundred ninety four million dollars ($394,000,000.00) from the unauthorized use of cellular telephone numbers and manufacturers electronic serial numbers. It was estimated that the unauthorized use of cellular telephones cost United States Cellular telephone companies six hundred million dollars ($600,000,000.00) during 1994. If nothing is done to prevent the unauthorized use of cellular telephones, the above figure is expected to be higher each successive year.

Cellular telecommunications systems that utilize encryption and employ encrypted seed number signals have been developed to make it more difficult to make unauthorized cellular telephone calls. One of the difficulties with prior art encrypted cellular telecommunications systems is that encrypted seed number signals are generated in the cellular telephone and the data center that is used by the specific cellular telephone. In addition synchronization must be maintained between the cellular telephone and data center. If, the user of the cellular telephone traveled outside of the area of the data center and made a telephone call, i.e. in a different state, the data center in the different state would probably not know the encrypted seed number signal. The reason for the above is that the data center in the traveled to state would not be in synchronization with the cellular telephone and would probably be unable to determine the encrypted seed number. Furthermore, when the cellular telephone user returned to use the data center in the state that was traveled from, the original data center would be out of synchronization with the cellular telephone. The data centers in different states would have to know the call history of each cellular telephone in order to determine the encrypted seed number. The foregoing would involve a large amount of communications between data centers that may be owned by different entities.

SUMMARY OF THE INVENTION

This invention overcomes the disadvantages of the prior art by providing a cellular telecommunications systems that utilizes the telephone number the cellular telephone is calling, with the number of telephone calls placed on that cellular telephone, i.e., call count and a seed number to create a digital signature of the data. The digital signature is used to make it more difficult to make unauthorized cellular telephone calls. The seed number may be changed after a predetermined number of calls has been made, i.e. one hundred, one thousand, etc. Thus, the transmission of seed numbers between data centers would be substantially reduced.

DETAILED DESCRIPTION OF THE PREFERRED EMBODIMENT

Figure 1:
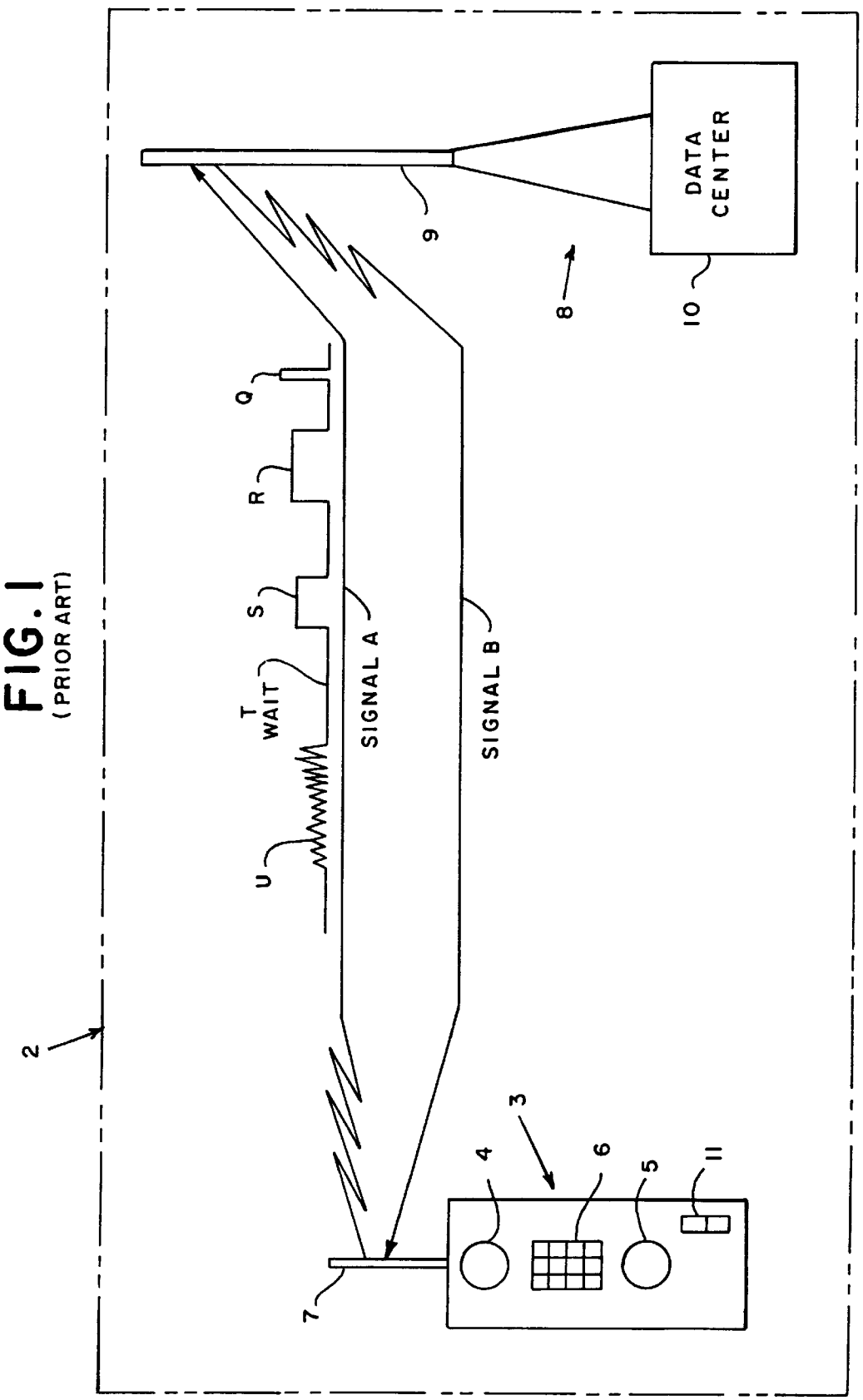
FIG. 1 is a drawing of a cellular telecommunications network that was utilized by the prior art.

In order to better understand that which separates this invention from the prior art consider the following. Refer to the drawings in detail, and more particularly to FIG. 1 a prior art cellular telecommunications network 2 is shown. Network 2 includes: a cellular telephone 3, that has a speaker 4, a mouthpiece 5, a keypad 6, an antenna 7, and a power switch 11; and a base station 8, that includes an antenna 9 and a data center 10.

When someone would want to place a telephone call on telecommunications network 2, they would activate power switch 11 and enter the telephone number they wish to call on keypad 6. Cellular telephone 3 will transmit signal A via antenna 7. Signal A has five components: Q; R; S; T; and U. Component Q contains handshake information to make cellular telephone compatible with base station 8 and component R contains the manufacturer's electronic serial number (ESN) for cellular telephone 3. Component S contains the mobil identification number (MIN) of cellular telephone 3 and component T is a delay. Component U is the phone number entered into keypad 6. Signal A is received by antenna 9 and processed by data center 10. The foregoing characters and numbers are checked at base station 8 to determine if the cellular telephone being used is allowed to use the base station selected and that the MIN of the cellular telephone being used has the correct manufactures electronic serial number. If Signal A contains the correct information about cellular telephone 3 i.e., the MIN and ESN are found to be correct, base station 8 further determines if the time elapsed and distance traveled by cellular telephone 3 from the last cellular telephone call are feasible. If components Q, R, S and T have been determined to be valid and if cellular telephone 3 traveled a feasible distance in the time elapsed from the last telephone call, component U is accepted by base station 8 and cellular telephone 3 is enabled. Base station 8 transmits signal B to antenna 7 and connects cellular telephone 3 to telephone communications network 2 to complete the connection.

Signal A is transmitted over specified radio frequencies and always contains the same fixed components Q, R, S, and T combined with a varying component U. Hence, Signal A may be intercepted by using conventional off the shelf electronic receiving equipment. Once Signal A is intercepted by a thief, Signal A can be used to make unauthorized cellular telephone calls. Even if a pin number or other identification number was added to signal A or signal B, the pin number or other identification number would still be broadcast in the open over the available radio frequencies. Thus, a thief would also be to determine the pin number or other identification number and make unauthorized cellular telephone calls.

Figure 2:
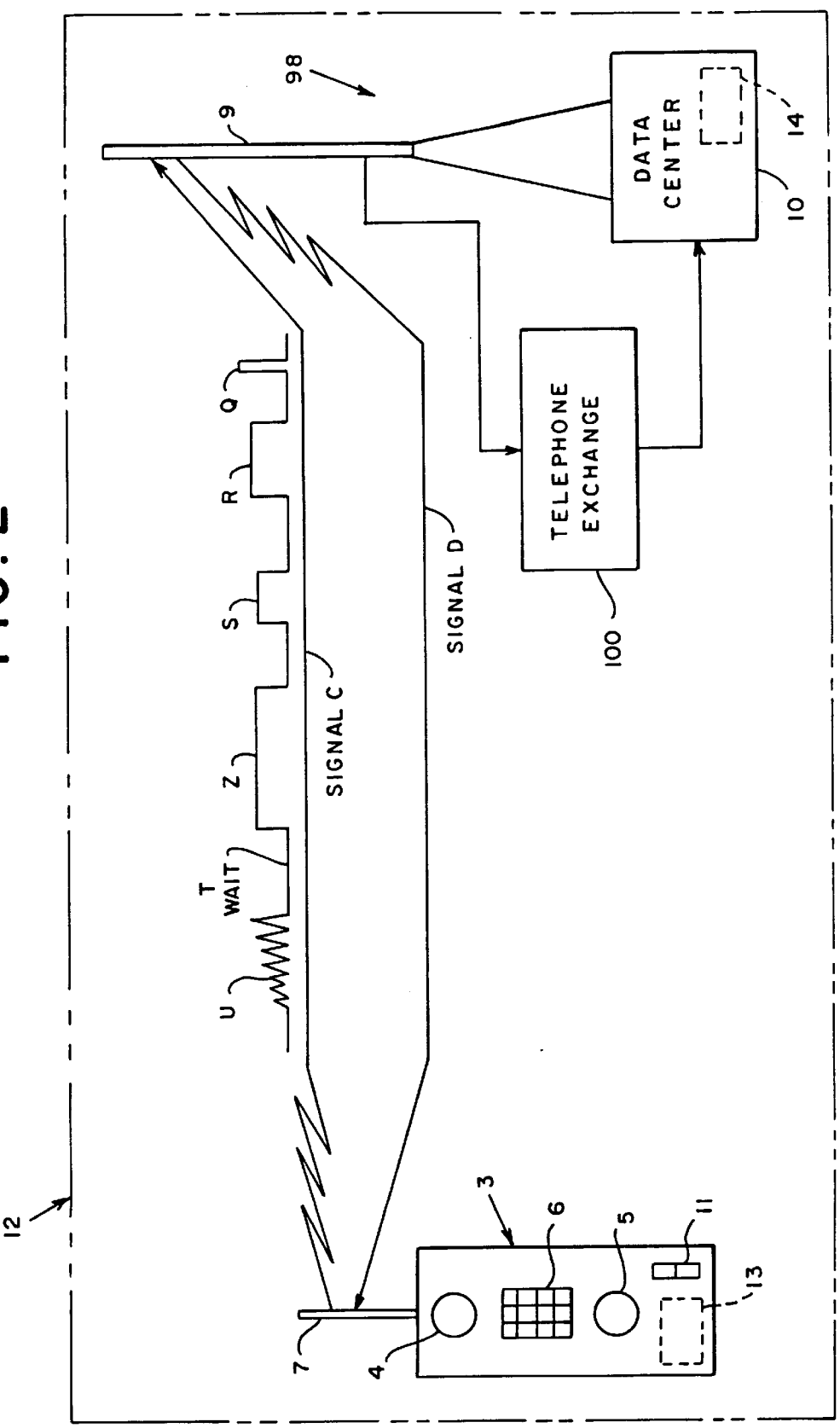
FIG. 2 is a drawing of the cellular telecommunications network of this invention.

FIG. 2 is a drawing of the cellular telecommunications network 12 of this invention. Network 12 includes: a cellular telephone 3, that has a speaker 4, a mouthpiece 5, a keypad 6, an antenna 7, a power switch 11 and a device 13 for creating a digital certificate which is component Z of Signal C (device 13 will be hereinafter described in the description of FIG. 3); a base station 98, that includes an antenna 9 and a data center 10 that includes a digital certificate verification device 14 (device 14 will be hereinafter described in the description of FIG. 4); and a telephone exchange 100.

When someone would want to place a telephone call on telecommunications network 12, they would activate power switch 11 and enter the telephone number they wish to call on keypad 6. Cellular telephone 3 will transmit Signal C via antenna 7. Signal C has six components: Q; R; S; Z; T; and U. Component Q contains handshake information to make cellar telephone 3 compatible with base station 98 and component R contains the manufacturer's electronic serial number (electronic serial number hereinafter called ESN) for cellular telephone 3. Component S contains the mobile electronic serial number hereinafter called MIN of cellular telephone 3 and component Z contains an digital certificate that changes from transmission to transmission. Component Z will be more fully described in the description of FIGS. 3 and 4. Component T is a delay and component U is the phone number entered into keypad 6. Signal C is received by antenna 9 and processed by data center 10. The foregoing transmitted characters and numbers are checked at base station 98 to determine if cellular telephone 3 is allowed to use the base station selected and that the telephone number of the cellular telephone being used has the correct ESN. If Signal A contains the correct information about cellular telephone 3 i.e., the MIN and ESN are found to be correct, the base station 98 further determines if the time elapsed and distance traveled by cellular telephone 3 from the last cellular telephone call are feasible. If, cellular telephone 3 traveled a feasible distance in the time elapsed from the last telephone call, data center 10 reads component Q. If component Q contains the correct information, base station 98 transmit Signal D to antenna 7 and connects cellular telephone 3 to telephone communications network 12, via telephone exchange 100.

Signal C is transmitted over specified radio frequencies and always contains different information, component Z will always have different information. Hence, even if Signal C is intercepted by conventional off the shelf electronic receiving equipment. Signal C would not be able to be used by a thief to make another unauthorized cellular telephone calls.

Figure 3:
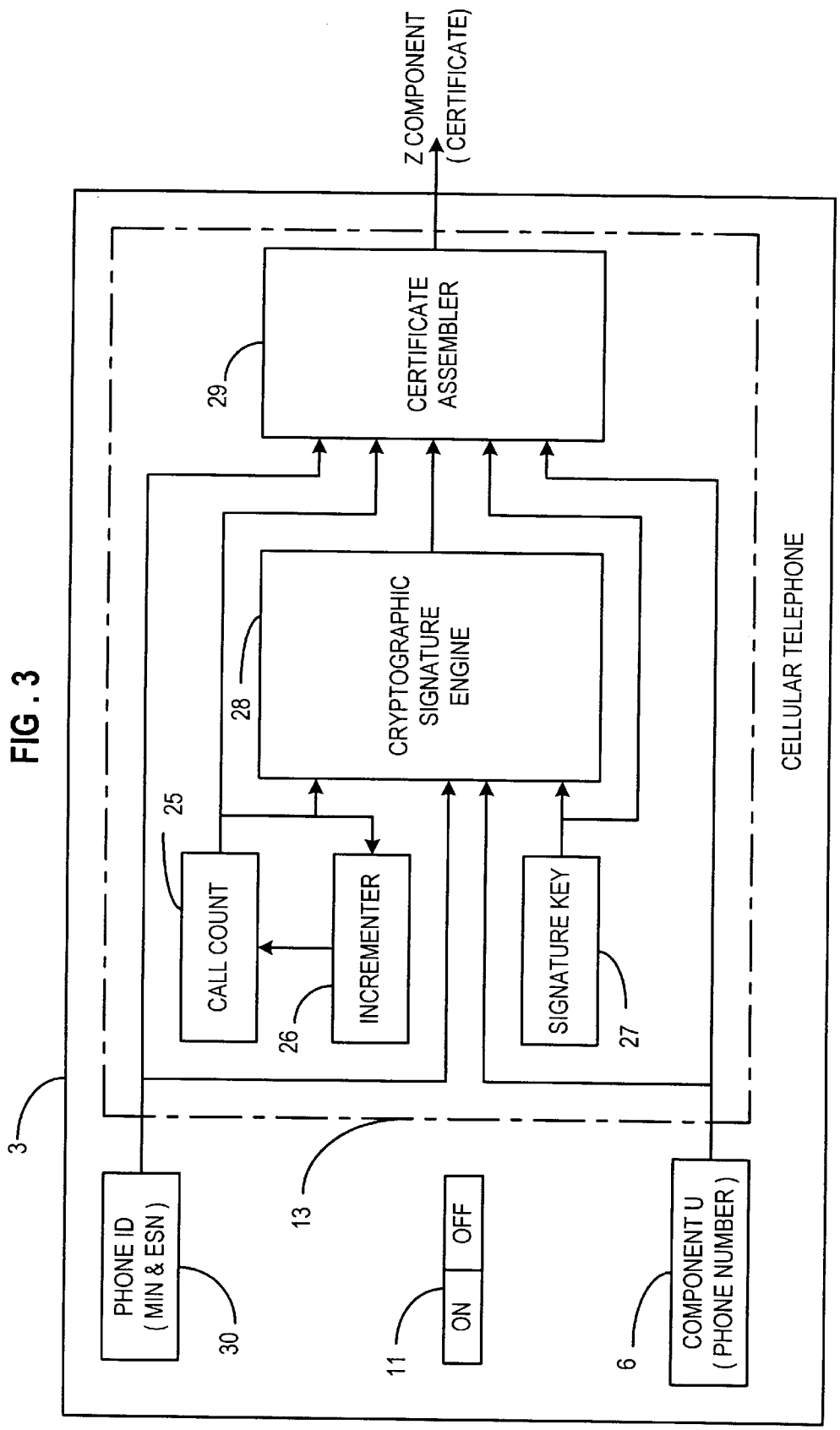
FIG. 3 is a block drawing of a portion of the cellular phone of the apparatus of this invention.

FIG. 3 is a block drawing of a portion of cellular phone 3 of the apparatus of this invention. The portion of phone 3 that is shown are: Phone electronic serial MIN and ESN registers 30; on/off switch 11; component U of signal C which is the phone number dialed by keypad 6 and digital certificate creation device 13. Digital certificate creation device 13 includes: call counter 25; incrementer 26; signature key 27; microprocessor or cryptographic signature engine 28; and certificate assembler 29. The output of incrementer 26 is coupled to the input of call count 25. Incrementer 26 increases one count each time a telephone call is made on cellular phone 3 and call counter 25 stores the number of calls made by cellular telephone 3. The output of call count 25 is coupled to the input of incrementer 26, cryptographic signature engine 28; and certificate assembler 29. The other inputs to engine 28 are: the output of registers 30; the output of signature key register 27; and the phone number dialed by keypad 6. Register 27 stores the key for creating digital signatures. Engine 28 is a microprocessor that creates a digital signature by applying the Data Encryption Standards to its inputs. The Data Encryption Standards are described in FIPS PUB 46-1, dated January 1988 and published by the United States Department Of Commerce, National Bureau of Standards, herein incorporated by reference. In addition, a standard encryption scheme, such as the RSA encryption technique, can also be used. It will be obvious to one skilled in the art that different public and private standards may be utilized.

The output of engine 28 is coupled to one of the inputs of certificate assembler 29. The other inputs to assembler 29 are: the output of registers 30; the output of call count 25; the output of register 27 and the output of keypad 6. Assembler 29 combines all of its parallel inputs to produce a concatentated output, which serially represents the inputs to assembler 29.

As a result of using call count 25, cellular telephone 3 may communicate with data stations 10 that may be owned by different entities or carriers. Component Z of signal C may be ignored by other carriers or post processed by other carriers. In either case, less security is achieved. If, component Z has been post processed and an error found future telephone calls may be blocked. However, when cellular phone 3 tries to communicate with the original data station 10 that it left to communicate with a data station 10, owned by a different carrier, there would be no need to synchronize the original data station 10 with cellular telephone 3. The reason for the above is that the call count is kept by cellular telephone 3.

Figure 4:
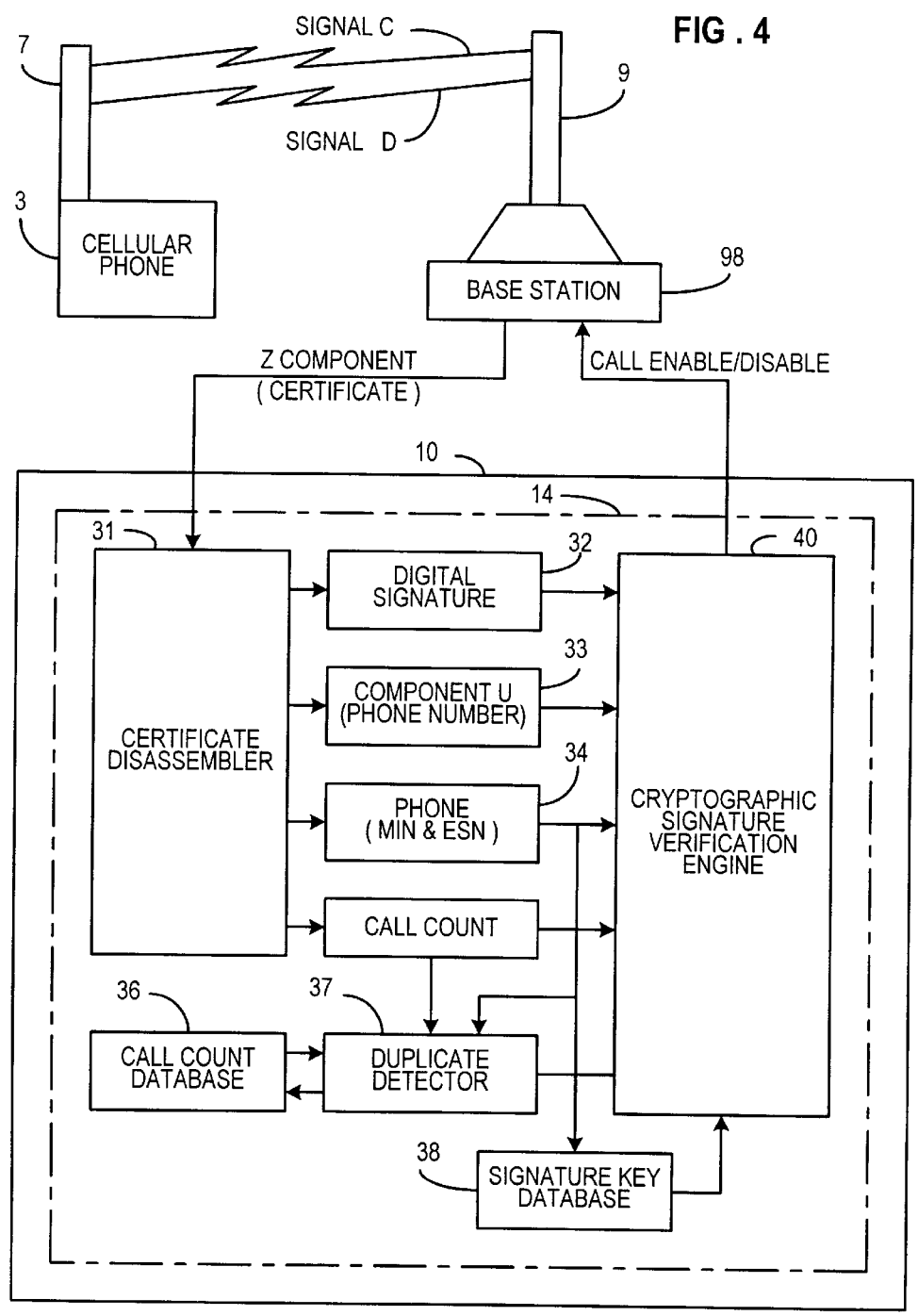
FIG. 4 is a block drawing of the cellular base station portion of the apparatus of this invention.

FIG. 4 is a block drawing of the cellular base station 98 portion of the apparatus of this invention receiving a phone call from cellular phone 3 via antenna 7. Antenna 7 transmits Signal C (shown in FIG. 2) to antenna 9 of base station 98. Data center 10 includes device 14. Device 14 includes: certificate disassembler 31, digital signature register 32;

Component U (phone number) register 33; phone MIN and ESN registers 34; call count 35; call count data base 36; duplicate detector 37; signature key data base 38; and cryptographic signature verification engine 40. Base station 98 transmits component Z of Signal C to the input of certificate disassembler 31. Disassembler 31 is a serial to parallel converter that partitions component Z into the various components that constitute component Z. Thus, diassembler will transmit the digital signature portion of component Z to register 32 and the dialed phone number (component U) portion of component Z to register 33. Diassembler 31 will also transmit the MIN and ESN portion of component Z to registers 34 and the call count to register 35. One of the outputs of call count 35 is coupled to one of the inputs duplicate detector 37 and one of the outputs of register 34 is also connected to one of the inputs of detector 37. One of the outputs of detector 37 is connected to call count data base 36. Database 36 is a memory that stores all of the telephone calls made by cellular telephone 3. Detector 37 is a comparator that checks with database 36 to determine if the phone call currently being made by cellular telephone 3 does not have the same call count as a telephone call previously made by cellular telephone 3. One of the outputs of register 34 is coupled to the input of signature key database 38. Database 38 contains a listing of all signature keys that can use data center 10. Cryptographic verification engine 40 has six parallel inputs, which are the outputs of registers 32, 33, 34 and 35, detector 37 and database 38. Engine 40 is a microprocessor that repeats the process of engine 28 and compares the result with the number stored in register 33. If, the result matches the number stored in register 33, then engine 40 sends a signal to base station 98 to enable the phone call. If, the result does not match the number stored in register 33 and the call count is not a duplicate, then engine 40 sends a signal to base station 98 to disable the phone call.

The above specification describes a new and improved cellular telecommunications systems that utilizes encryption and a call count that permits a cellular telephone to remain in synchronization with a data center owned by one carrier after the cellular telephone communicates with a data center owned by another carrier. It is realized that the above description may indicate to those skilled in the art additional ways in which the principles of this invention may be used without departing from the spirit. It is, therefore, intended that this invention be limited only by the scope of the appended claims.

What is claimed is:

1. A system for determining authorized cellular telephone usage and connecting one or more cellular telephones to a telephone network, said system comprising:
   means located in a cellular telephone for generating an authentication signal that contains a telephone number being called, a call count of the number of telephone calls made and a digital signature of telephone numbers called, and a seed number that may be changed after a specified number of calls have been made;
   means located at a site remote from the cellular telephone for verifying the authentication signal;
   means located at a site remote from the cellular telephone for comparing portions of the authentication signal to determine if specific portions of the authentication signal have been previously used to determine authorized cellular telephone usage;
   means for comparing the authentication signals to determine authorized cellular telephone usage; and
   means for connecting the cellular telephone to the network if the authentication signals are verified and specific portions of the authentication signal are verified.

2. The system claimed in claim 1, wherein the portions of the authentication signal that are compared are the call count.

3. The system claimed in claim 1, wherein the authentication signals are compared at a later time.

4. The system claimed in claim 1, wherein the connecting means deny the telephone from being connected to the network after the authentication signals are not verified.

5. The system claimed in claim 1, wherein the connecting means will deny future connections to the network after the authentication signals have not been verified.

6. A system for determining authorized cellular telephone communications between one or more cellular telephones and a base station and connecting the authorized cellular telephone communications to a telecommunications network, said system comprising:
   means contained within the cellular telephone for generating a digital certificate that specifies a telephone number being called, a call count or telephone numbers called and a seed number that may be automatically changed after a specified number of calls have been made;
   means coupled to the base station for receiving the digital certificate generated by said generating means;
   means contained in the base station for comparing portions of the digital certificate to determine if specific portions of the digital certificate have been previously used to determine authorized cellular telephone usage,
   Means contained within the base station for verifying the digital certificate that is unique to the cellular telephone communicating with the base station; and
   Means contained within the base station for connecting the cellular telephone to the network if the digital certificate and specific portions of the digital certificate are the same.

7. The system claimed in claim 6, wherein the cellular telephone is able to communicate with base stations that are able to verify the digital certificate and base stations that are not able to verify the digital certificate.

8. The system claimed in claim 6, wherein the digital certificates are compared at a later time.

9. The system claimed in claim 6, wherein the verifying means deny the telephone from being connected to the base station after the digital signature is not verified.

10. The system claimed in claim 6, wherein the verifying means will deny future connections to the base station after the digital certificate has not been verified.

11. A method for determining authorized cellular telephone communications between one or more cellular telephones and a base station, and connecting the authorized cellular telephone communications to a telecommunications network, said method comprising the steps of:
    generating a digital certificate in the cellular telephone that includes a telephone number being called, a call count of telephone numbers called, and a seed number that may be automatically changed after a specified number of calls have been made;

transmitting the digital certificate;

receiving the digital certificate;

comparing portions of the digital certificate to determine if specific portions of the digital certificate have been previously used to determine authorized cellular telephone usage;

verifying the digital certificate; and connecting the cellular telephone to the network if the digital certificate and specific portions of the digital certificate are the same.

12. The method claimed in claim 11, further including the steps of: communicating with base stations that are able to verify the digital certificate and base stations that are not able to verify the digital certificate.

13. The method claimed in claim 11, wherein the verifying step is done at a later time.

14. The method claimed in claim 11, wherein the connecting step will deny the telephone from being connected after the digital certificate has not been verified.

15. The system claimed in claim 11, wherein the connecting step will deny future connections to the network after the digital certificate has not been verified.

* * * * *